UNITED STATES PATENT OFFICE.

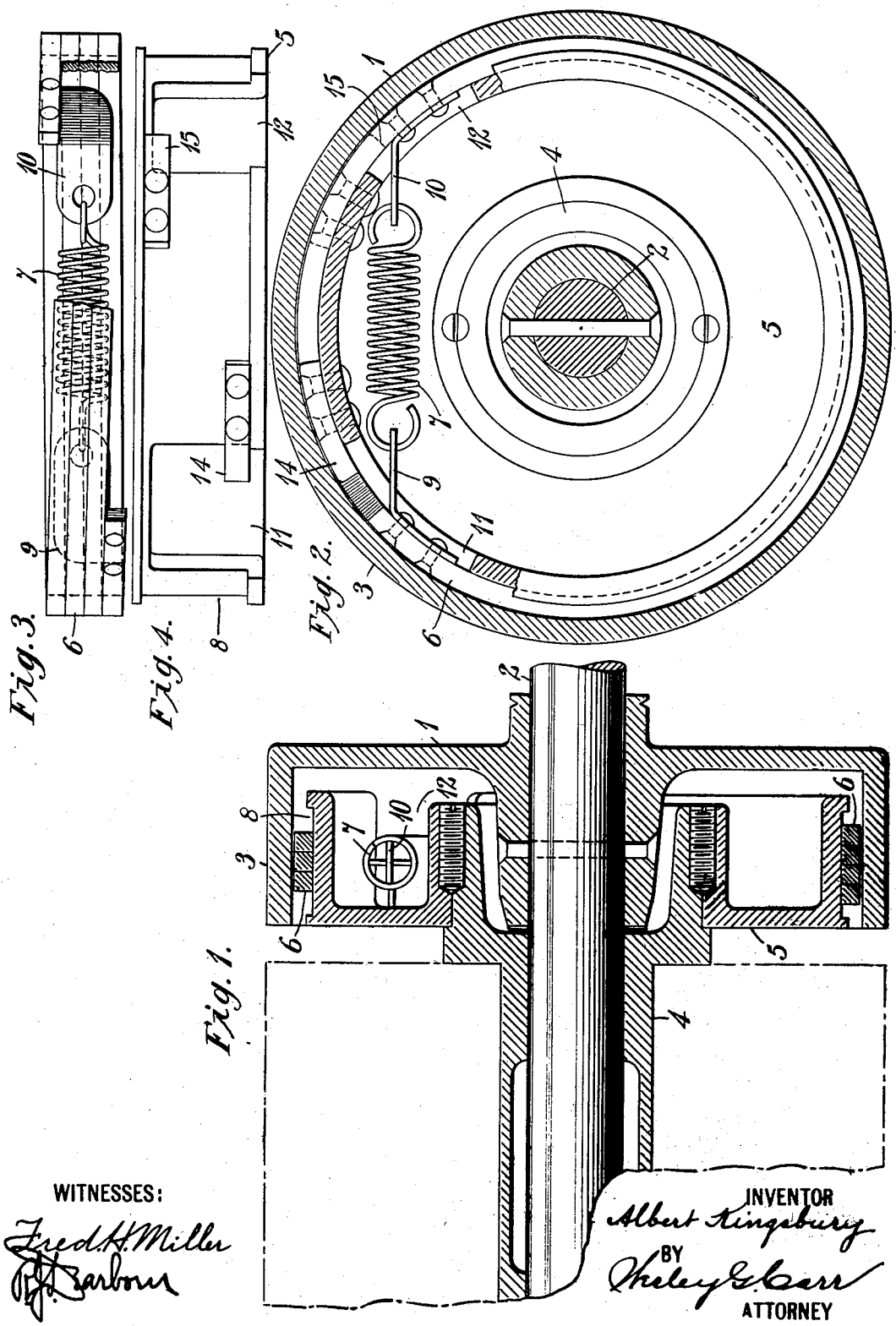

ALBERT KINGSBURY, OF PITTSBURGH, PENNSYLVANIA, ASSIGNOR TO WESTINGHOUSE ELECTRIC AND MANUFACTURING COMPANY, A CORPORATION OF PENNSYLVANIA.

FRICTION-CLUTCH.

1,109,232.  Specification of Letters Patent.  Patented Sept. 1, 1914.

Application filed August 7, 1911. Serial No. 642,883.

*To all whom it may concern:*

Be it known that I, ALBERT KINGSBURY, a citizen of the United States, and a resident of Pittsburgh, in the county of Allegheny and State of Pennsylvania, have invented a new and useful Improvement in Friction-Clutches, of which the following is a specification.

My invention relates to friction clutches and particularly to such clutches as are dependent upon centrifugal action for their operation.

The object of my invention is to provide a clutch which shall be simple and durable in construction and capable of transmitting energy to a rotatable member with equal efficiency in either direction.

In Patent No. 882,693, granted to the Westinghouse Electric & Manufacturing Company on an application filed by me March 6, 1905, I have shown and described a friction clutch comprising a hollow cylindrical member in which a resilient ring, divided at one point in its circumference, is located, a spring being arranged to draw the ends of the interrupted ring together and centrifugal action being depended upon to act in opposition to the spring and the resiliency of the ring to force the ring into engagement with the cylinder in which it is located.

According to my present invention, I provide an annular support on one member of the clutch and a concentric hollow cylindrical pulley on the opposing member of the clutch and interpose a circumferentially arranged helical spring, which is located in a groove in the annular support and is provided with a tension spring, for causing it to wrap around the support. When the support and the helical spring are rotated at a predetermined speed, the circumferential spring will expand and firmly grip the inner cylindrical surface of the opposing member of the clutch.

Figure 1 of the accompanying drawings is a longitudinal section of a clutch constructed in accordance with my invention. Fig. 2 is an end elevation, partially in transverse section, of the parts shown in Fig. 1. Figs. 3 and 4 are detail views of the support and the spring shown in the other figures.

Referring to the drawings, the clutch here shown comprises a pulley or other suitable member 1 which is secured to a rotatable shaft 2 and is provided with a circumferential flange 3, a sleeve or quill 4 rotatably mounted on the shaft 2, a support 5, secured to the sleeve or quill 4 within the flange 3, a circumferentially disposed helical spring 6 and a tangentially disposed tension spring 7.

An annular groove is provided in the outer cylindrical surface of the support 5 in which the helical spring 6 is disposed, the arrangement of parts being such that the turns of the spring engage the bottom of the groove 8 and clear the inner cylindrical surface of the flange 3 except when the sleeve 4 and the support 5 are rotating at a predetermined speed. The spring 6 is preferably formed of steel wire of square or rectangular section, in order to provide a large bearing surface.

Clips 9 and 10 are riveted, or otherwise secured to the respective ends of the spring 6 and extend inwardly through apertures 11 and 12, which are provided for that purpose in the periphery of the support 5, the relatively small tension spring 7 being interposed between the clips 9 and 10 and tending to wrap the spring 6 about the support 5.

The support 5 is provided with stops 14 and 15 with which the respective ends of the spring 6 engage during the operation of the clutch, according to the direction of rotation of the support.

The operation of the clutch is as follows: The shaft 2 may be the shaft of an electric motor or other similar device to which the driving pulley 1 is secured. The rotating member of the motor is secured to the sleeve or quill 4 and, consequently, when the motor is started, the shaft and the pulley to which the load may be assumed to be connected, is at rest. When the motor armature attains a predetermined speed of rotation, the centrifugal forces acting on the spring 6 will expand it, in opposition to the tension spring 7, forcibly into engagement with the inner cylindrical surface of the flange 3. Frictional engagement between these parts will cause the pulley 1 and the load to revolve with the motor armature in a well known manner. The stops 14 and 15 prevent any material relative rotation between the support 5 and the spring 6. By utilizing the spring 6 instead of a divided ring or some other member, I find that the action of the clutch is very positive and the outer surface of the spring continues to grip the inner surface of the flange very firmly as long as the speed is maintained.

The clutch illustrated may, of course, be utilized for any suitable purpose and I intend that my invention shall be limited only as specified in the appended claims.

I claim as my invention:

1. The combination with two independently rotatable members having concentric annular surfaces, of a helical spring held upon the inner annular surface against relative rotative movement and expansible by centrifugal force to engage the outer annular surface.

2. The combination with a driven shaft having an annular clutch member and a driving member having an annular surface located within said clutch member, of a helical spring mounted upon said annular surface and held thereon against relative rotative movement, and a tension spring for normally clamping the helical spring to said annular surface and the pull of which is overcome by centrifugal force when the driving member attains a predetermined speed of rotation.

3. A clutch comprising concentric driving and driven rotatable members and an interposed circumferentially disposed helical spring that is constrained to turn with the driving member and is expansible by centrifugal force to effect a frictional locking engagement between said members.

4. A friction clutch comprising a hollow cylindrical member, an independently rotatable driving member, a circumferentially interposed helical spring that is expansible by centrifugal force to engage the hollow cylindrical member and is constrained to turn with the driving member, and means acting upon said spring in opposition to centrifugal force.

5. A friction clutch comprising a pair of concentric independently rotatable members, an interposed helical spring having closed turns of rectangular cross section, a spring tending to wrap the helical spring about the inner member, and means for preventing rotative movement of said helical spring upon said inner member.

6. The combination with an annular clutch member having a circumferential groove in its outer surface and an independently rotatable member having a flange extending over the circumferential groove and concentric with it, of an interposed helical spring, means tending to hold the spring in engagement with the peripheral groove of the inner member, and means for preventing rotative movement of said spring in said groove.

In testimony whereof, I have hereunto subscribed my name this 31st day of July, 1901.

ALBERT KINGSBURY.

Witnesses:
BERTRAND P. ROWE,
B. B. HINES.